(12) United States Patent
Donohue et al.

(10) Patent No.: US 6,262,717 B1
(45) Date of Patent: Jul. 17, 2001

(54) KIOSK TOUCH PAD

(75) Inventors: Thomas E. Donohue, American Fork; Paul H. Glad; James L. O'Callaghan, both of Salt Lake City, all of UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 09/110,098

(22) Filed: Jul. 2, 1998

(51) Int. Cl.[7] .................................................. G09G 5/00
(52) U.S. Cl. ................................................... 345/173
(58) Field of Search ..................... 345/156, 157, 345/173, 174, 175, 176, 177, 179, 168; 341/22; 178/18.01–18.11, 19.01–19.07

(56) References Cited

U.S. PATENT DOCUMENTS

| | | |
|---|---|---|
| 3,886,311 | 5/1975 | Rodgers et al. . |
| 4,071,691 | 1/1978 | Pepper, Jr. . |
| 4,103,252 | 7/1978 | Bobick . |
| 4,179,723 | 12/1979 | Spencer . |
| 4,246,452 | 1/1981 | Chandler . |
| 4,265,059 | 5/1981 | Johnson . |
| 4,476,463 | 10/1984 | Ng et al. . |
| 4,495,485 | 1/1985 | Smith . |
| 4,550,221 | 10/1985 | Mabusth . |
| 4,587,378 | 5/1986 | Moore . |
| 4,639,720 | 1/1987 | Rympalski et al. . |
| 4,672,154 | 6/1987 | Rodgers et al. . |
| 4,680,430 | 7/1987 | Yoshikawa et al. . |
| 4,736,191 | 4/1988 | Matzke et al. . |
| 4,740,781 | 4/1988 | Brown . |
| 4,743,895 | 5/1988 | Alexander . |
| 4,817,043 | 3/1989 | Brown . |
| 5,245,321 | * 9/1993 | Franz et al. ........................... 345/157 |
| 5,271,669 | 12/1993 | Pearlson . |
| 5,305,017 | 4/1994 | Gerpheide . |
| 5,327,161 | 7/1994 | Logan et al. . |
| 5,457,636 | 10/1995 | Sansone et al. . |
| 5,481,250 | 1/1996 | Hano . |
| 5,572,573 | 11/1996 | Sylvan et al. . |
| 5,717,433 | 2/1998 | Doba . |
| 5,730,602 | 3/1998 | Gierhart et al. . |
| 5,737,729 | 4/1998 | Denman . |
| 5,748,185 | 5/1998 | Stephan et al. . |

FOREIGN PATENT DOCUMENTS

| | | |
|---|---|---|
| 0 574 213 A1 | 7/1993 | (EP) . |
| WO 97/18546 | 5/1997 | (WO) . |

\* cited by examiner

*Primary Examiner*—Dennis-Doon Chow
(74) *Attorney, Agent, or Firm*—Trask Britt (57) ABSTRACT

A simplified touch pad which detects a "touch" in a specific absolute positioning programmable zone or "enter/select" zone rather than requiring a "tap". The touch pad also has an audible feedback device built into the touch pad for immediate feedback and a touch sensitive surface comprising a relative cursor positioning zone. By simplifying a touch pad to include only basic functions, the touch pad is easier to operate, simpler to manufacture, and more amenable to use with graphical interface display systems typically using touch screens. The invention is preferably incorporated into a kiosk where simplified use is of great benefit. An embodiment of the invention includes an enclosure which completely seals the touch pad from external contamination making the touch pad waterproof and dust proof A cover plate also provides durability and added protection for the touch-sensitive surface of the touch pad.

30 Claims, 7 Drawing Sheets

KIOSK TOUCH PAD

TECHNICAL FIELD

This invention relates to an improved interface control for graphical user interface systems such as those currently using a touch screen. More specifically, the invention relates to a touch pad having a defined programmable input zone which responds to any "touch" or "push" rather than requiring a "tap" to input an "enter/select" command.

BACKGROUND

Computer systems today strive for "user friendliness." Through simpler, more clearly explained displays and easier-to-use interfaces, designers attempt to make a system understandable for both an expert and a first time user. Designers developed touch screen displays from this desire for user friendly systems. Touch screen displays comprise a display surface on which an operator can selectively display information or perform a function by touching an icon displayed on the screen in an interactive manner. The touch screen is operatively connected to a microprocessor which stores, computes, and supplies information required or functions to perform. Several touch screen displays and their applications are described in the following patents: U.S. Pat. No. 5,737,729 to Denman (Apr. 7, 1998), U.S. Pat. No. 5,717,433 to Doba (Feb. 10, 1998), U.S. Pat. No. 5,572,573 to Sylvan (Nov. 5, 1996), U.S. Pat. No. 5,481,250 to Hano (Jan. 2, 1996), and U.S. Pat. No. 5,457,636 to Sansone (Oct. 10, 1995).

A kiosk, or small stand, is used for merchandising or vending services or goods, or for accessing information. Kiosks are well known in the art as indicated by the following U.S. Pat. No. 4,179,723 to Spencer (Dec. 18, 1979), U.S. Pat. No. 4,265,059 Johnson (May 5, 1981), U.S. Pat. No. 4,817,043 to Brown (Mar. 28, 1989), and U.S. Pat. No. 5,271,669 to Pearlson (Dec. 21, 1993). One advantage of a kiosk is that it can be provided in public areas and be used by many operators because of the simple, secure system provided in conjunction with the kiosk. Kiosks often include a microprocessor and visual display or monitor for interaction with the operator. This interaction is generally simple and allows an operator to step through several preset options by typing basic commands on a keyboard or selecting the options on a touch screen interface which perform internal functions such as calculations or displaying information, distributing merchandise or money, or if associated with a printing device and paper source, printing an output.

Touch screens are currently used in many commercial and noncommercial fields including industrial control systems such as plant and process controls, commercial control systems such as typical kiosk systems used with postal, photo, copy center, video phone, hospitals, and ATM systems, information kiosks such as those used in many tourist areas, libraries and restaurants, and many other systems where simple operator-interactive means are needed. Many systems also combine touch screens with other interface systems such as numeric or alphanumeric key pads (e.g., ATMs), and other more simple function keys. Although touch screen systems, as they exist, function adequately, there are a number of inadequacies. First, touch screen displays are relatively expensive. A typical touch screen display costs more than a non-touch screen display.

Second, because the screen of a touch screen display needs to be touched to activate it and because touch screens give off heat, touch screens are not easy to completely seal from the environment. This drawback may become significant when the display needs to be used in an area where it will be subjected to dust, chemical or bacterial contamination, or where the risk of contact with moisture is high. Because the system is not completely sealed and insulated from its surroundings, careful, thorough cleaning methods are applied, and the risk exists that contamination will damage the internal components of the device or come in contact with a subsequent user.

Third, once the screen is touched, the operator must wait for the computer to indicate the operator pressed hard enough and long enough for the touch screen to register the selection. Depending on how busy the system's processes are, this passage of time can be almost instantaneous, or can take some time. Often this delay frustrates users who make a selection which the processor does not register and indicate fast enough and they inadvertently make a second undesired selection by pressing again.

It would be advantageous to have a device as user friendly as a touch screen which is inexpensive, sealed to contamination, easily washable, and provides immediate feedback when an operator makes a selection.

User friendly input devices for computers are well known in the art. One of the several types of input devices is the familiar "mouse." When combined with a graphical user interface, a mouse can be much easier to use than typed keyboard commands. By moving the mouse across a surface, an operator causes a cursor to move correspondingly on a display screen. The mouse has been accepted as a "user friendly" input device for both experienced and novice computer users providing a simple means to interact with a computer. However, mice are disadvantageous in many applications because they generally require a free-rolling surface, e.g., a table top, on which to operate. Thus, a mouse is not well suited for use in confined spaces, or where little or no surface space exists such as with a kiosk or other touch screen application. A mouse also includes mechanical parts which can become jammed, dirty or worn, and generally cannot be sealed from outside contamination.

In answer to the long existing need for a more convenient input device suitable for all space requirements, limited or not, various alternative input devices have been proposed. These alternative input devices include devices commonly referred to as track balls, track pens and track point devices, as well as various devices which sense the position of a pointing object on a position sensing surface. Devices which sense the position of a pointing object on a sensing surface generally have the advantages of being simple to use, reliable, rugged, compact and easy to integrate with current computers and other computing devices.

Numerous types of input devices utilize a position sensing surface. Examples are provided in various patent references. For example, U.S. Pat. No. 3,886,311 to Rodgers et al. (May 27, 1975) discloses a writing pen for detecting a time varying electrostatic field produced by a writing tablet. U.S. Pat. No. 4,672,154, also to Rodgers et al. (June 9, 1987) discloses a cordless stylus which emits a directional electric field from the tip of a conductive pen cartridge sensed by a digitizer tablet having an X-Y coordinate system. U.S. Pat. No. 4,680,430 to Yoshikawa et al. (Jul. 14, 1987) discloses a tablet-like coordinate detecting apparatus including a resistive film for determining the coordinate position data of a point on a plane indicated by the touch of a finger tip or other load. U.S. Pat. No. 4,103,252 to Bobick (Jul. 25, 1978) discloses a position sensing tablet with electrodes located on the boundaries of a sensing region which detects a human touch by the change in capacitive charge caused by the touch which varies the time constant of an RC network which is part of an oscillator. U.S. Pat. No. 4,736,191 to Matzke (Apr. 5, 1988) discloses a touch activated control device comprising individual conductive plates wherein a user's touch on the dieleectric layer overlaying the plates is detected by individually charging and discharging each of the sectors in the plates in a sequential manner to determine the increased capacitance of the sector. U.S. Pat. No. 4,550,221 to Mabusth (Oct. 29, 1985) discloses a touch sensitive control device which translates touch location to output signals and which includes a substrate that supports first and second interleaved, closely spaced, non-overlapping conducting plates. U.S. Pat. No. 4,639,720 to Rympalski et al. (Jan. 27, 1987) discloses an electronic sketch pad which contains a graphics input pad having an array of transparent capacitive pixels, the capacitance characteristics of which are changed in response to the passing of a conductive tipped stylus over the surface of the pad. European Patent Publication 574,213 to Miller (filed Jul. 6, 1993, published Dec. 15, 1993) discloses a proximity sensor that includes a sensor matrix array which senses changes in capacitance between horizontal and vertical conductors connected to the position sensing pad to determine x, y & z position information).

Among recent additions to the position sensing pad art is U.S. Pat. No. 5,305,017 to Gerpheide (Apr. 19, 1994). The devices and methods of the Gerpheide patent include a touch sensitive input pad upon which a user conveniently inputs position information with a finger. In operation, the user's fingertip is brought in close proximity to the top surface of the position sensing surface of the touch sensitive pad. The device of the Gerpheide patent detects the position of the fingertip in the horizontal ("x") and vertical ("y") directions of the touch pad, as well as the finger's proximity in the z direction in relation to the sensing surface. A device with a relative position sensing surface which is primarily operated by the touch of an operator's finger is commonly called a touch pad. In addition to a finger, Gerpheide's and many other touch pads can also be operated by other conductive objects.

Touch pads detect a finger placed on or near the sensing surface and translate movement of the finger into corresponding movement of a cursor on a display screen. One advantage of using a touch pad as an input device is that space is conserved. More specifically, the touch pad can be fixed in place and an operator can still manipulate a cursor on a display screen. This characteristic is very important when space constraints are at a premium.

Specifically, with regard to touch pad technology, touch pads have been modified for additional user friendliness through the addition of feedback systems. Touch pads with tactile feedback systems were developed to assist an operator in determining through touch where the operator's finger is resting in relation to different touch pad regions. An example of tactile feedback is disclosed in co-owned, co-pending International Publication Number WO 9718546 to Gerpheide (filed Nov. 12, 1996, published May 22, 1997), herein incorporated by reference. The tactile feedback disclosed by Gerpheide includes a combination of textures and raised ridges on the pad surface to indicate programmable "button" portions which, when tapped, execute a function programmably assigned to that button.

Touch pads with auditory feedback were developed to assist an operator in determining when a portion of the touch pad has been selected. An example of auditory feedback is disclosed in co-owned, co-pending U.S. patent application Ser. No. 08/558,126 (Gerpheide, filed Nov. 13, 1995), herein incorporated by reference. The auditory feedback disclosed by Gerpheide includes a microprocessor using the PC speaker to emit a tone to indicate a selection has been made. However, as with the touch screen display system, this audible feedback is subject to the processor's response time, and may be slow.

Touch pads have also been adapted to perform additional functions by defining numeric or alphanumeric key pads on a portion of the surface of a touch pad. An example of an adaptable touch pad is disclosed in co-owned, co-pending U.S. patent application Ser. No. 08/923,677 (Glad, filed Sep. 4, 1997), herein incorporated by reference. More recently, touch pads have also been adapted by adding a stylus and pattern recognition software for recognizing signatures and handwriting such as that commercially sold by Advance Recognition Technologies, Inc. of Chattsworth, Calif., and CyberSIGN, Inc. of Santa Clara, Calif.

In addition to the many advantages provided by touch pads existing in the art, disadvantages also exist, both generally, as previously mentioned, and when existing touch pads are applied to particular applications. First, existing touch pads, even those with enter zones on the touch pad surface, require a combination of operator taps on the surface to send a "mouse button click" or "enter/select" command to the host computer. For example, a slow and hard, down-and-up tap motion of the finger is required by some touch pads to generate a "mouse button click" command. The appropriate timing and force for the taps of a given pad, although convenient and efficient for expert users, do take time to learn and can be confusing and even painful for novice users and even expert users on a new system. Furthermore, there are people who, because of physical limitation, are unable to perform the tap combinations required on existing touch pads, or the double-click combination required by existing mouse devices. Second, existing touch pads include many functions which are not needed in many simple applications such as in an information kiosk or other graphical interface. These additional functions may complicate touch pad operation and confuse an operator. Third, existing touch pads are not durable enough for many applications. Due to the thin plastic layer typically used to protect the sensing surface, touch pads may wear or deteriorate after extended or frequent use. Furthermore, the thin plastic layer typically used on the sensing surface of a touch pad may be insufficient to protect the surface from abrasive environments where kiosk systems are typically found such as industrial plants, restaurants, copy centers, hospitals, ATMs, and other environments where a touch pad will be used frequently by one person or frequently by numerous people such as in a library or other information center. Fourth, touch pads which are not completely sealed from external contamination may be inadequate for environments where dust, chemicals, moisture, or other contamination is prevalent, or risk of exposure to liquids is high.

It would be advantageous to have a touch pad which is simple to learn and use, includes only the functions necessary for a simple application such as a graphical user interface, is more durable and rugged than existing touch pads, can be completely sealed from external contamination, and is not subject to processor speed for providing audible feedback to inform an operator that a selection has been made.

DISCLOSURE OF THE INVENTION

The invention includes a touch pad for use in a kiosk or other graphical user interface system such as desktop computers. For simplified use, the touch pad may have a relative cursor positioning touch-sensitive zone, an absolute positioning touch-sensitive zone, and an auditory feedback device. The touch pad may also have a second absolute positioning touch-sensitive zone programmed to scroll-up or scroll-down depending on the direction an operator's finger is moving within the region. Optionally, the touch pad may be enclosed by a housing to seal the touch pad completely from external contamination. In one embodiment, a rigid and durable protective plate is placed over the touch pad sensing surface to increase the life of the touch pad. In another embodiment, tactile feedback is used to assist an operator in distinguishing between touch pad zones by touch.

Some of the advantages of the invention are seen in its simplicity of use, user friendliness, durability, and applicability. By establishing "touch" sensitive absolute positioning zones, operators are not required to learn or use "taps" to operate a system, but can instead operate the zone on the touch pad surface similar to a mechanical button without the disadvantages associated with mechanical buttons. By simplifying a touch pad to include only basic functions required for graphical user interface applications such as point and click, and scroll-up and -down, the touch pad is simple to use for both beginners and experts. By completely sealing the touch pad from external contamination, the touch pad is waterproof and dust proof, making the touch pad more easily cleaned and reliable in contaminating environments. By covering the touch-sensitive surface with a protective plate, the touch pad is more durable and thus lasts longer in environments where heavy use is a factor or additional protection is needed. Finally, by adding sensory feedback to indicate the differences between zones, and when a zone has been selected, the touch pad is more user friendly and useful to an operator.

Other features and advantages of the present invention will become apparent from a consideration of the drawings and related description.

BRIEF DESCRIPTION OF THE FIGURES

In the drawings, which depict presently preferred embodiments of the invention and in which like reference numerals refer to like parts in different views.

BEST MODE FOR CARRYING OUT THE INVENTION

Figure 1:
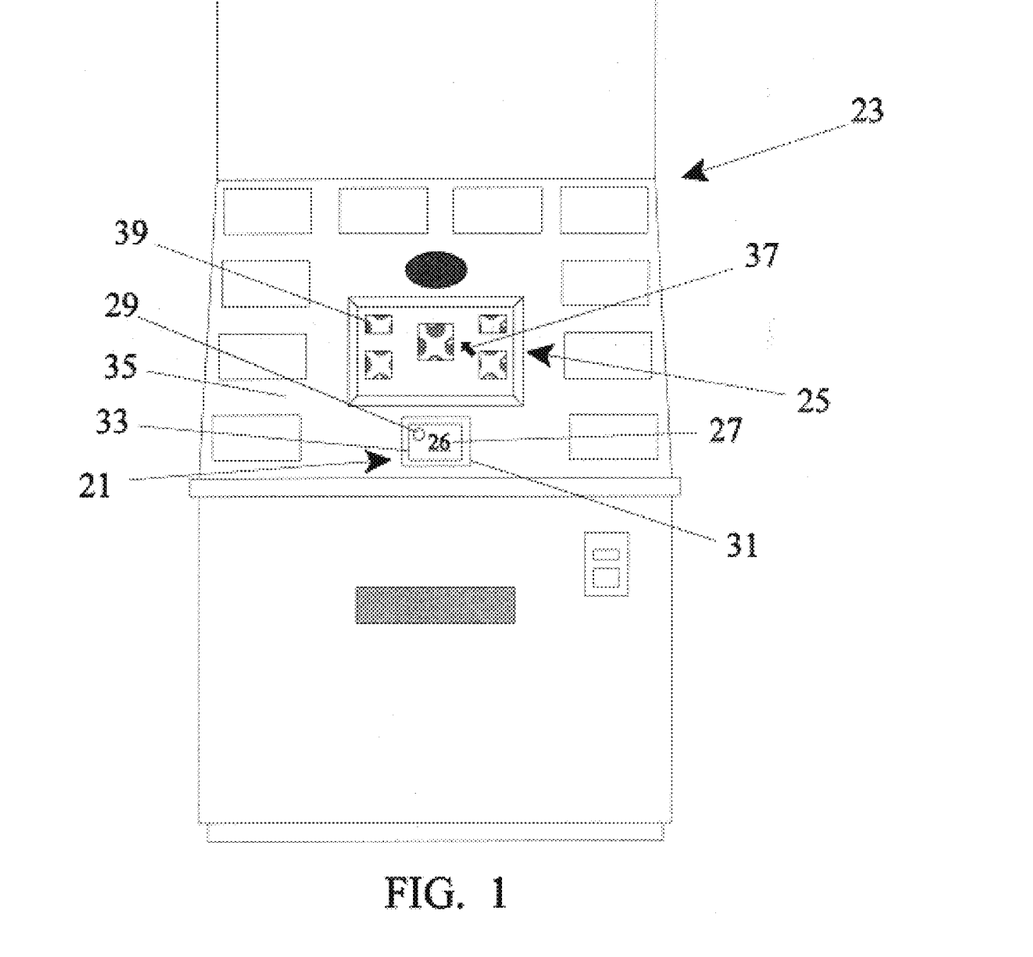
FIG. 1 is a front view of a kiosk employing a graphical monitor and a touch pad.

FIG. 1 depicts a preferred touch pad 21 for use in a kiosk generally 23 in addition to a touch screen monitor 25, or with an ordinary monitor 25, in place of the touch function typically served by a touch. The touch pad 21 comprises a programmable touch-sensitive surface 26 having at least two contiguous zones: a relative cursor positioning zone 27, and an "enter" or "select" zone 29. The "enter" or "select" zone 29 is an absolute positioning programmable zone 29 preferably programmed to register an "enter", "select" or "mouse button click" command to the host computer (not shown) when the touch-sensitive surface in that zone detects a "touch" from an operator's finger. A "touch" includes any form of touching done within the programmable zone 29, such as pressing, tapping, or even simply bringing a finger substantially near the programmable zone 29. The farther from the touch-sensitive surface a conductive object, such as a finger, is placed, the less the surface is able to detect its presence. The distance from which a conductive object can be placed from a given tough-sensitive surface technology and still be detected varies with each surface and technology used, and can be readily determined by one of ordinary skill in the art. The "tap" required by existing touch pads to input an "enter" or "select" command or select a programmable zone on the surface of the touch pad requires a specific duration, as well as a sufficient surface area (or "z-value") registering the contact to function correctly. Unlike the "tap" required by existing touch pads to select a programmable zone, the "touch" permitted by the current invention registers contact within the programmable zone 29 and inputs the command regardless of the duration of the contact. In other words, the current invention registers the "touch" contact and inputs the command upon contact, or substantially upon contact, thereby simulating a mechanical button, whereas existing touch pads input the command not upon contact, but upon release and only if the "touch" is held throughout a timing requirement duration within a window of time established within the system not too long, not too short. Thus, the programmable zones 29 of the current invention respond to any "touch" with sufficient z-value as defined by the programming without a timing requirement. It is also preferable that the relative cursor positioning zone 27 be programmed so as to not be capable of relaying an "enter/select" command. This means that it is preferred that the "taps", which are used to actuate the "enter/select" command with many touch pad surfaces, not function to actuate the "enter/select" function on a touch pad with an "enter/select" zone 29. By creating a touch pad 21 which relays an "enter/select" command only when the "enter/select" zone 29 is touched, operator is less likely to mistakenly make a selection.

"Touch" capability is particularly useful in a touch pad because both novice and expert touch pad users may quickly and easily learn and perform operations using the simplified device without being required to first master the "tap" timing of a given touch pad. It is also contemplated that the "touch" capacity of the programmable zones 29 may alternatively be programmed to respond only to "touches" which are of a sufficiently long duration, for example, a duration longer than the "tap" duration required by existing touch pads. By requiring an extended "touch", unintentional "touches" can be more easily avoided.

A "touch" is preferably detected by the touch-sensitive surface 26 when a user's finger either actually touches the surface 26, or comes close enough to the surface 26 to indicate such an intention, although the surface can be programmed to respond otherwise by one of skill in the art. The enter/select zone 29 of the current embodiment is preferably substantially congruous with the contiguous relative cursor positioning zone 27 and programmed so that a finger "gliding" from the relative cursor positioning zone 27 through an absolute positioning programmable zone 29 will not register as a "touch" within the zone, but rather will be treated as if it simply glided across another part of the relative cursor positioning zone 27. However, if a finger not presently in contact with the touch pad surface touches within, or comes near enough to the surface 26 for the surface to detect a "touch", an "enter/select" command will be communicated to the host computer (not shown). It is contemplated that the enter/select zone 29 may be programmed to relay other commands, and that multiple enter/select zones programmed with other functions may also be placed on the touch sensitive surface to simulate mechanical buttons. Although it is preferable to avoid mechanical buttons due to problems inherent in mechanical buttons for many applications, it is contemplated that this device may also embody mechanical buttons in addition to simulated mechanical buttons.

In addition to the "touch" rather than "tap" nature of the invention simulating mechanical buttons, for durability and applicability, the touch pad 21 is preferably protected by a transparent cover plate 31 which overlays and preferably extends beyond the boundary 33 of the touch pad 21; thus the width and length of the cover plate 31 should correspond to, or exceed that of the touch-sensitive surface 26. The cover plate 31, although it is most preferably formed of glass for durability and cosmetics, may also preferably be formed of a polymer such as polycarbonate, or polyester and bonded or adhered to the touch-sensitive surface 26 where less durability is required. The thickness of the cover plate 31 will vary with the type of touch pad 21 used because different touch pads use different technologies, each having different tolerances. However, one of skill in the art can calculate the allowed maximum dimensions for a cover plate 31 used with a given touch pad 21. In the touch pad technology disclosed by Gerpheide in U.S. Pat. No. 5,305,017, however, for a durable, reliable system the cover plate 31 is preferably within the thickness range of 0.01 inches to 0.07 inches (0.0254 to 0.1016 centimeters). The cover plate 31 thickness, however, may be increased or decreased depending on the level of protection versus reliability of response desired for a given application. The cover plate 31, although preferably affixed to the kiosk face plate 35 by adhesive, may alternatively be affixed by screws or equivalent means. Since many touch pads exist which require actual finger contact with the surface of the touch pad for operation, and with which a cover plate would render the touch pad inoperable, it is contemplated that a cover plate is only preferable for protection in certain embodiments, and not required by the invention.

By bringing a finger, or other conductive object, near the surface of the touch pad 21 and moving it within the touch pad boundary 33, an operator can navigate a cursor 37 shown on the monitor 25 (also called a "display"). To select a function shown on the monitor 25, an operator navigates the cursor 37, using the relative cursor positioning zone 27, to a place on the monitor 25 corresponding to a desired function, often indicated by a graphical symbol 39 (or "icon"). An operator then selects the function by bringing a finger, or other conductive object near or in contact with the touch pad's touch-sensitive surface 26 within the enter/select zone 29. One particular advantage of using a touch pad to select objects rather than a touch screen with such a system is that it enables smaller screen icons 39 to be selected than with a touch screen. Because the cursor 37 can be programmed to appear as small as needed, and select objects as small as needed, even large fingers can select small or densely spread icons 39 using a touch pad.

Figure 2:
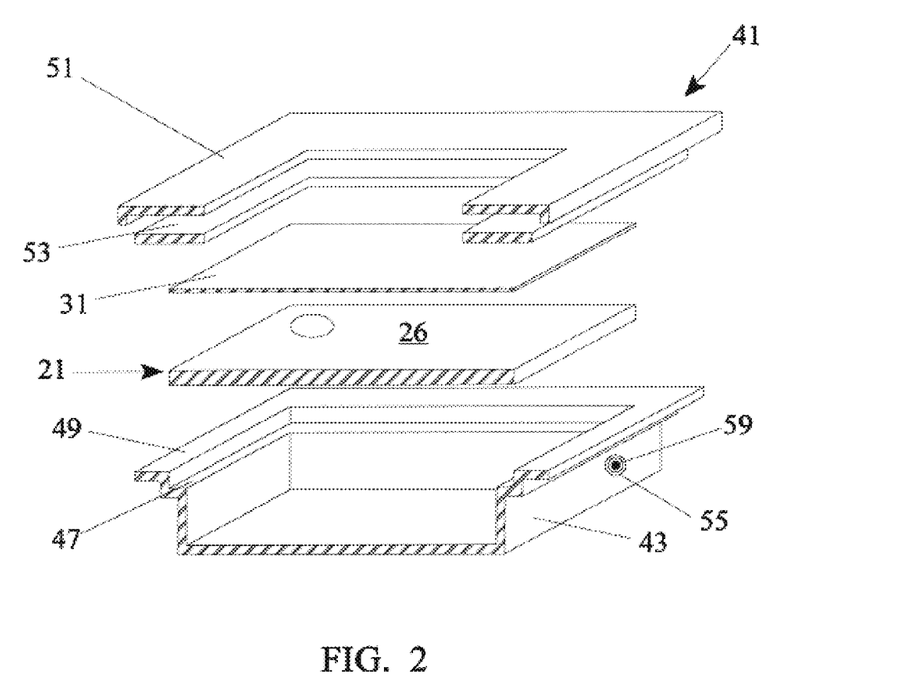
FIG. 2 is a sectional perspective view of a preferred embodiment of a touch pad touch-sensitive surface and protective enclosure separated to emphasize individual parts.

FIG. 2 depicts a preferred touch pad enclosure 41 which completely seals the touch pad 21 from external contamination. The enclosure 41 comprises a base 43 sized and shaped to contain the touch pad 21 and any related components 45 (see FIG. 4). The touch pad 21 is disposed within the base 43 which also preferably comprises an inset ridge 47 for seating the touch pad 21 and a lip 49 upon which a cover 51 and cover gasket 53 are disposed to seal the enclosure 41. An optional cover plate 31 is preferably placed between the cover gasket 53 and the touch pad's touch-sensitive surface 26 for added protection. The cover plate 31 may also be placed above the cover 51 for some applications, or the cover 51 may be formed into a cover plate 31, although this is less preferable because it may increase the distance between the cover 51 and the touch pad's touch-sensitive surface 26 and thereby decrease reliability. The cover plate 31 is preferably transparent allowing visual indications of the touch-sensitive zones (e.g., made with ink) on the surface of the touch pad 21 to be visible through the cover plate 31. However, transparency is not required as the cover plate 31 can be marked to indicate such zones, tactile feedback means previously discussed may be used, or no indication of touch-sensitive zones may be also preferable in some applications. It is also preferable, where a completely waterproof and dust proof enclosure is desired, to seal the touch pad cables (not shown) and provide a system with no mechanical buttons.

Figure 4:
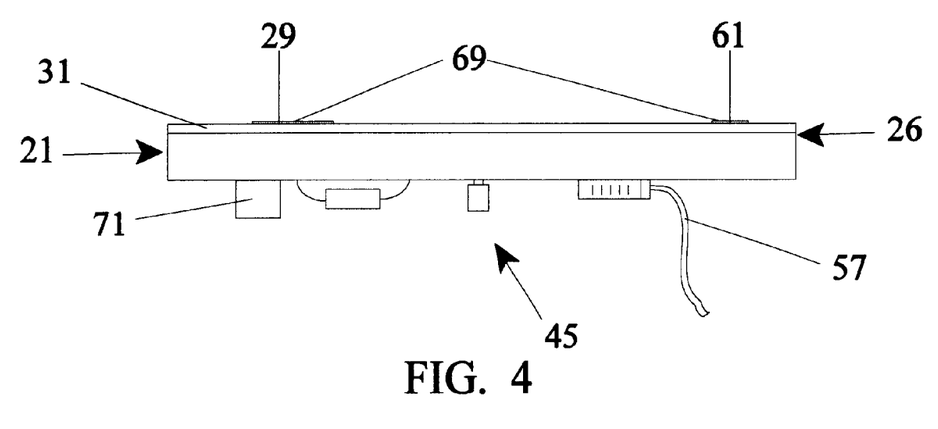
FIG. 4 is a side view of a preferred embodiment of a touch pad depicting a protective cover, a touch-sensitive surface, a speaker, and electronic components.

In the embodiment of FIG. 2, the base 43 further comprises a touch pad cable aperture 55 sufficient to house a touch pad cable 57 (see, FIG. 4). The touch pad cable aperture 55 is sealed (e.g., made waterproof and dust proof) by a cable gasket 59 placed within the touch pad cable aperture 55 around the touch pad cable 57 (FIG. 4). The waterproof and dust proof nature of the touch pad enclosure 41 can be further reinforced by the use of adhesive or other sealant in relation to the touch pad cable aperture 55, touch pad cable 57 (not shown) and cable gasket 59. Although it is not required for the invention, the cover 51 and cover gasket 53 are preferably affixed to the base and touch pad by adhesive for a better seal. The touch pad cable 57, may optionally be sealed with a protective layer to further prevent contamination.

The cover 51 can be manufactured to engage the base 43 in a way that secures the cover 51 to the base 43 and creates a seal through the cover gasket 53 (e.g., a snap-fit, adhered, or screwed-on cover). The base 43 and cover 51 may be formed of a polymer, or of a metal such as aluminum. If a metal is used, an additional layer of insulative material preferably should be placed so as to insulate the touch pad touch-sensitive surface 26 from the metal. Similarly, gaskets 53 and 59 and methods of their manufacture are well known in the art.

For a sealed system, the cover 51 or the cover gasket 53 preferably overlaps the touch pad boundary 33 sufficient to create a watertight and dust tight seal, and is associated with the base 43, which in addition to other seals described herein, serves to completely seal the touch pad circuitry from external contamination. If the touch pad 21 is to be used in an area where bacterial or chemical contamination is a concern and seams are undesirable due to the nature of the potential contamination, the cover plate 31 may alternatively include an entire panel having no seams or apertures. In this case, the touch pad 21 is preferably adhered to the back of the panel by an adhesive or supported by a structure, the monitor also being placed behind the panel and supported by a structure.

Figure 3:
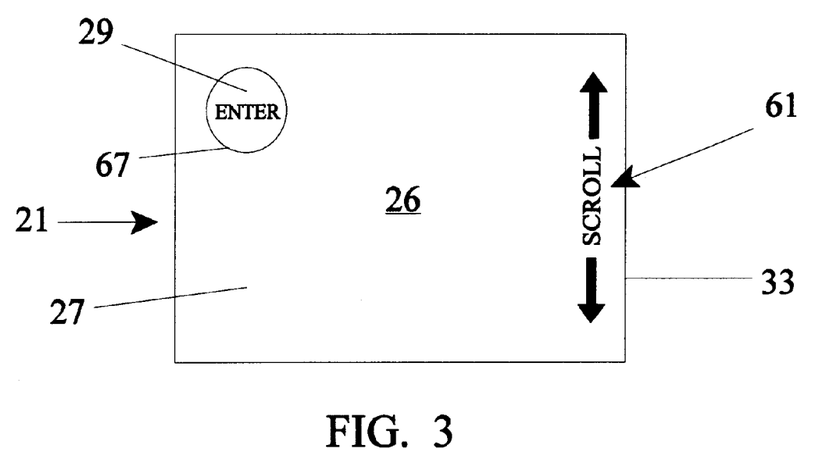
FIG. 3 is a top view of a preferred embodiment of a simplified touch-sensitive surface depicting an "enter zone", a "scroll zone", and a "relative cursor positioning zone".

FIG. 3 depicts a top view of the touch pad 21 showing a touch pad boundary 33, a relative cursor positioning zone 27, and an enter/select zone 29. An optional scroll zone 61 is also included. The enter/select zone boundary 67 is preferably raised for tactile feedback, or the enter/select zone 29 may be textured. The scroll zone 61 and the relative cursor positioning zone 27 may also have textured or raised portions for providing tactile feedback in addition to, or instead of the tactile feedback provided over the enter/select zone boundary 67.

Alternatively, the tactile feedback 69 may be provided on the surface of the cover plate 31 (see, FIG. 4). As depicted in the embodiment of FIG. 4, the cover plate 31 rests immediately above the touch pad 21 and tactile feedback 69 preferably corresponds to the appropriate zones on the touch pad's touch-sensitive surface 26. The enter/select zone 29 may also be indicated to the user by a printed pattern on the reverse side of the cover plate 31, away from the operator's touch, marked preferably with the word "enter" in red ink and a circle indicating the boundary 67 of the enter/select zone (see, FIG. 3). Similarly, the scroll zone 61 can be indicated by an ink drawing in the location of the scroll zone 61. Ink on the cover plate 31 may also be used to provide decorative designs or a logo.

In a preferred embodiment, the cover plate 31 is a thin sheet of glass, the front surface of which is frosted by blasting, acid etching or other well-known process. The frosted texture is comfortable to the touch by reducing the friction between the finger and the glass surface. In this case, a pattern in the etching may be used to indicate the enter/select zone 29 or the scroll zone 61. This etching pattern may be combined with the use of an ink pattern on the back side of the glass. The back side of the glass is preferably frosted to increase adhesion of the ink pattern and increase the adhesive effectiveness if adhesive is used to affix the cover plate 31 to the touch pad 21.

A thin overlay of plastic, such as is commonly used on touch pads, may alternatively be used as a cover plate 31 instead of glass. In this case, the enter/select zone 29 and scroll zone 61 may be indicated either by a change in the texture of the surface as described in International Publication Number WO 9718546 to Gerpheide (filed Nov. 12, 1996, published May 22, 1997 or by an embossing or debossing process used to create a ridge in the plastic. Either of these approaches has the advantage of being easily detected by an operator's touch. Alternatively, the zones may be indicated by ink printing, preferably on the reverse side of the clear plastic overlay.

FIG. 4 depicts an embodiment of the touch pad 21 where the touch pad's electronic components 45 are mounted on the reverse side of the touch pad 21. This embodiment also includes an optional speaker 71 for auditory feedback. The speaker 71 is preferably a piezo alarm or other device known in the art which can be directly attached to the touch pad 21 for immediate response when a predesigned region of the touch pad's touch-sensitive surface 26 is selected. By directly attaching the speaker to the touch pad 21 such that the auditory feedback is not subject to a main microprocessor's processing speed, a user is truly given immediate feedback. It is contemplated, however, that the main processor may also be used to produce a sound for auditory feedback. Optionally, a device programmed to emit a flash of light or illuminate as visual feedback could also be incorporated into the embodiment to indicate when a zone has been selected for additional useful feedback. An example of such visual feedback is given in co-owned, co-pending U.S. patent application Ser. No. 08/923,677 to Glad (filed Sep. 4, 1997). FIG. 4 also depicts a touch pad cable 57 for communication with the main microprocessor. It is further contemplated that a given system can employ multiple forms of sensory feedback simultaneously; auditory, tactile and visual.

Figure 5:
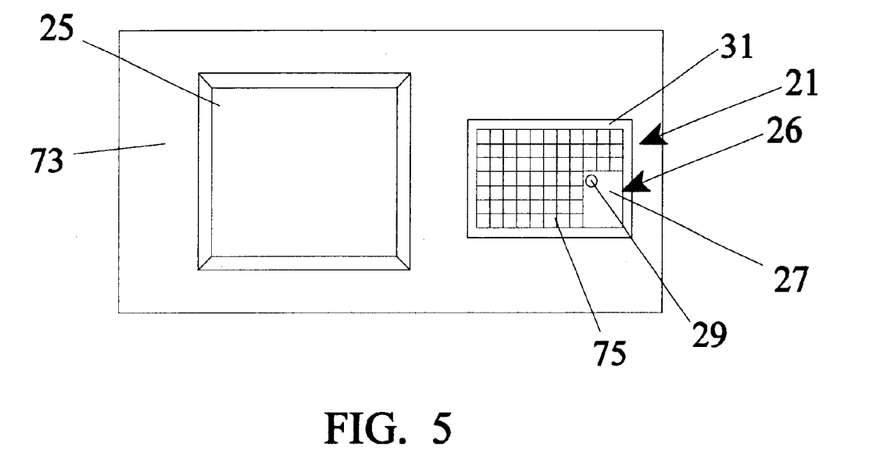
FIG. 5 is a front view of an interactive panel employing a monitor and a touch pad adapted for alphanumeric or symbolic entry, as well as relative cursor positioning.

FIG. 5 depicts a preferred embodiment of the invention for use with a system requiring both graphical user interface and alphanumeric interface, but lacking the space required for a keyboard. The depicted embodiment would also work in an application requiring a completely sealed system as described in relation to the embodiment shown in FIG. 2. Such a system would be useful in an industrial plant, a scientific lab, a hospital, a kitchen, or even a kiosk exposed to the weather where the nature of the environment is such that space is at a premium and the possibility for contamination or contact with fluids is high.

Depicted in FIG. 5 is a panel 73 comprising a monitor 25, a touch pad 21 and a cover plate 31. The touch pad's programmable touch-sensitive surface 26 comprises a relative cursor positioning zone 27 and an enter/select zone 29, similar to previously described embodiments, but also including other absolute positioning zones 75. These absolute positioning zones 75, similar to the enter/select zone 29, each directly correspond to a given function which is communicated to the microprocessor when a corresponding zone 75 is selected. An example of absolute positioning zones is described in co-owned, co-pending U.S. patent application Ser. No. 08/923,677 to Glad (filed Sep. 4, 1997). These zones can correspond to familiar functions such as alphanumeric, or numeric entry functions, or to other functions specific for a given system. As will be clear to one of skill in the art, tactile feedback is also beneficial with regard to this embodiment to distinguish between each of the above-described zones. An absolute positioning zone may also be programmed to correspond to a function which toggles the operating mode of the touch pad so that a portion of the touch pad operates either as a relative positioning zone, or an absolute positioning zone to increase the functionality and applicability of the touch pad. It is further contemplated that an embodiment of the present invention may include multiple absolute positioning zones programmed to communicate "hold", "drag lock", "release", or numerous other commands when touched.

Figure 6:
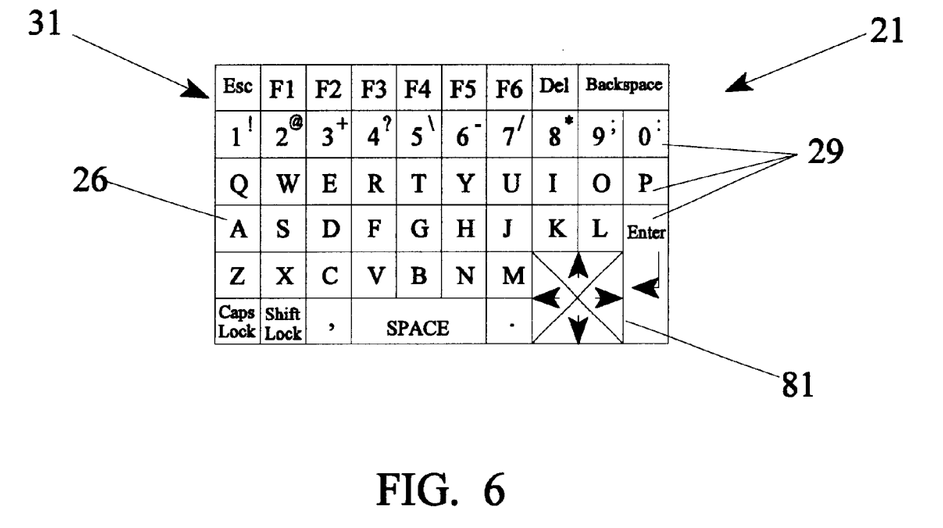
FIG. 6 is an front view of a embodiment of an alphanumeric touch pad.

FIG. 6 depicts the front view of a preferred embodiment of a touch pad 21 having a cover plate 31 marked for use with a touch pad programmed to respond as an alphanumeric keypad. For a touch pad 21 used with the cover shown, the touch pad touch-sensitive surface 26 comprises multiple absolute positioning programmable zones 29, each programmed to respond independently to a touch within the zone 29 by submitting the function indicated within the zone 29 to a microprocessor (not shown) associated with the touch pad. The directional zone 81 shown in this embodiment preferably operates as a relative positioning zone, but may alternatively be programmed to respond as four-independent cursor positioning zones such as those found on a standard keyboard. Alternatively, or additionally, a function key (not shown) may be provided so that the touch-sensitive surface, or a portion of it, can functionally toggle between multiple absolute positioning zones and a single relative positioning zone. Preferably, the boundaries of each zone are raised for tactile feedback in distinguishing between the zones. As with the other embodiments discussed in conjunction with this disclosure, other forms of sensory feedback may also be used to assist a touch pad operator with use of this touch pad embodiment.

Figure 7:
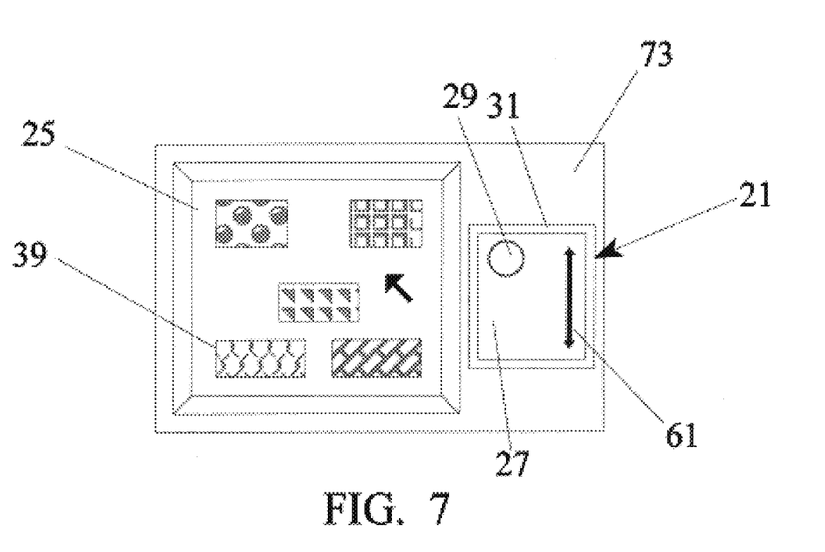
FIG. 7 is a front view of an interactive information panel employing a graphical interface monitor and a touch pad having a scroll zone, enter zone, and relative cursor positioning zone.

FIG. 7 depicts an embodiment of the invention for use as an information kiosk. FIG. 7 shows a kiosk panel 73 housing a monitor 25 having graphic symbols 39 corresponding to assigned functions, a touch pad 21, and a cover plate 31. An advantage of this embodiment for use in an information kiosk is its simplicity and low cost.

Information kiosks using a graphical user interface require an operator to select an object on the screen to access specific information. After an operator selects specific information, the operator often needs to scroll up or down to view all of it. A typical example of an application where this embodiment would be particularly useful is an operator viewing a web page. Where there is a web link an operator wishes to follow, the operator can simply navigate the screen cursor using the touch pad until the cursor points to the desired link. The operator then simply needs to touch the enter/select zone and the kiosk will provide the next linked screen full of information. Such a simplified touch pad 21, having only a relative cursor positioning zone 27, a touch sensitive enter/select zone 29, and a scroll zone 61 is easy to use for both beginners and experts, and considerably less expensive than a touch screen. It is contemplated that this invention need not only be used in public or frequently used systems. A desktop or portable computer which needs a simplified user interface will similarly benefit from such a device.

As will be clear to one of ordinary skill in the art, the touch pad may be programmed to operate with standard, familiar graphical user interfaces (e.g., Microsoft WINDOWS or an internet browser) without special driving software. Similarly, the touch pad may contain all that is needed to function in any given system without the special software required for a touch screen interface.

Figure 8:
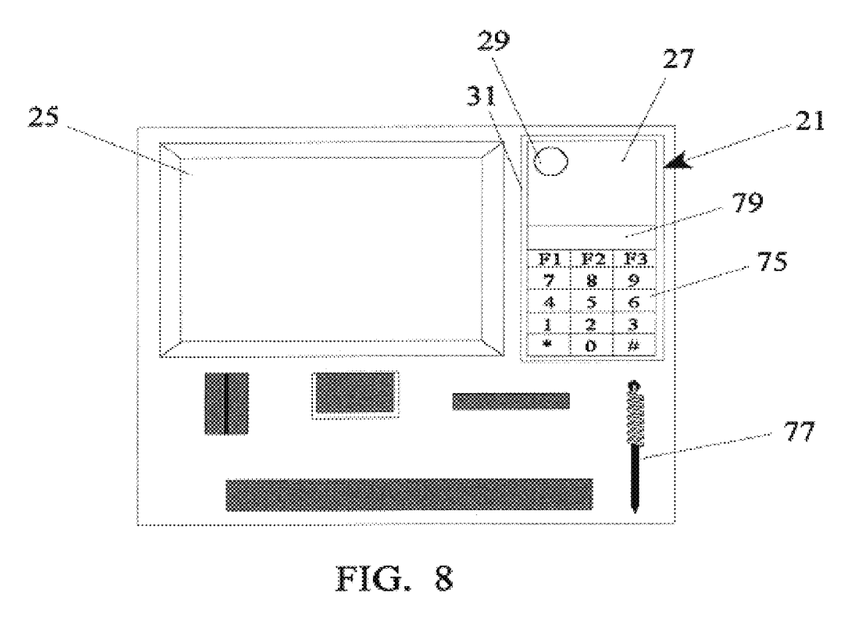
FIG. 8 is a front view of a kiosk panel such as that of an ATM, depicting a monitor and a touch pad with a relative cursor positioning zone, an enter zone, a numeric entry zone, and a signature verification zone with stylus for signature entry.

FIG. 8 depicts another embodiment of the invention for use with a kiosk such as an ATM. FIG. 8 shows a monitor 25, a touch pad 21, a cover plate 31 and a stylus 77. The touch pad 21 for this embodiment includes a relative cursor positioning zone 27, an enter/select zone 29, several absolute positioning zones 75 arranged for use in part as a numeric pad, and a signature recognition zone 79.

Figure 9:
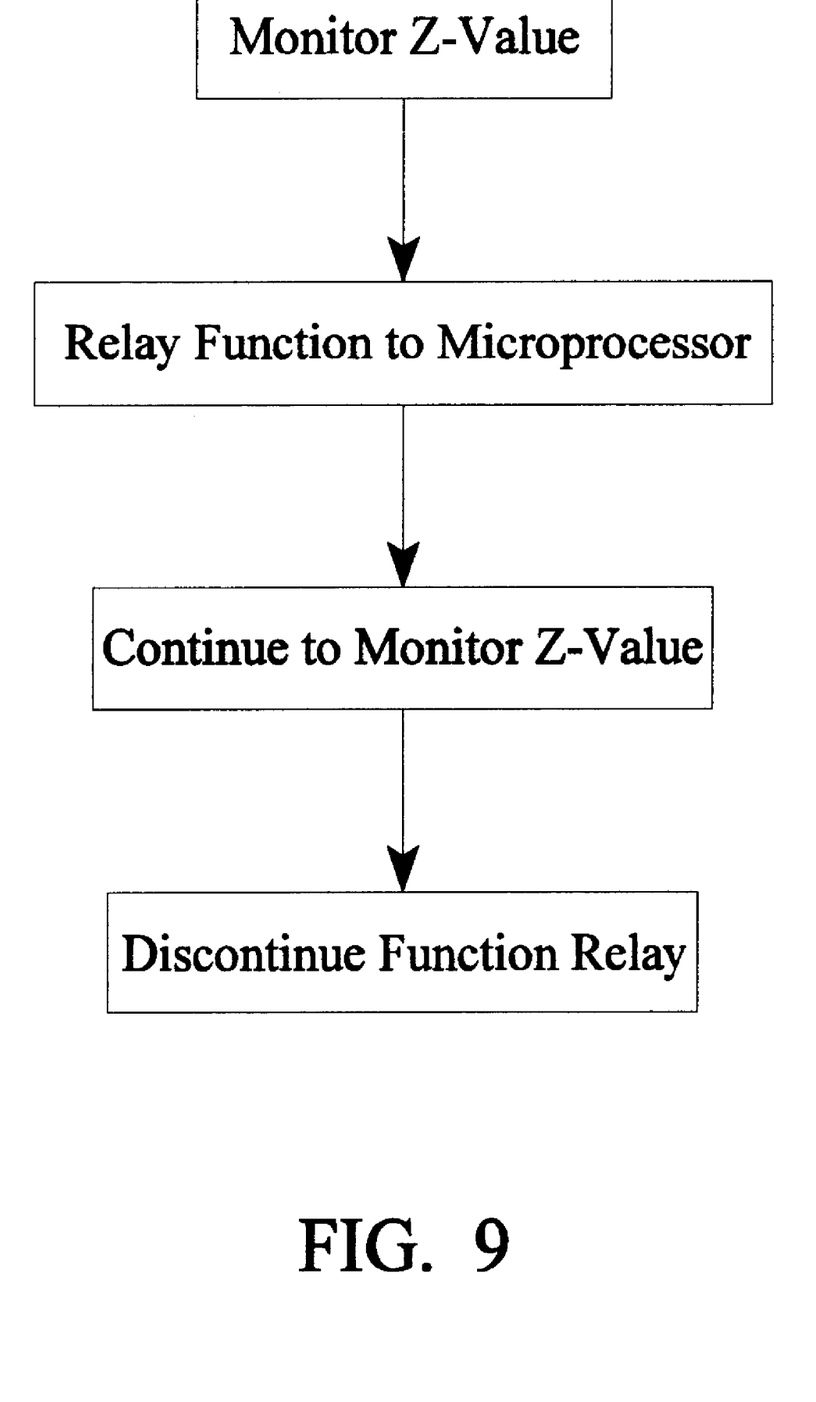
FIG. 9 is a block diagram depicting a method of operating a touch-sensitive absolute positioning zone associated with a microprocessor.

FIG. 9 depicts a block diagram depicting a method of operating a touch-sensitive absolute positioning zone associated with a microprocessor. First, the z-value (surface area touched) of the zone is monitored. Second, when the z-value of the zone exceeds a predetermined level, a function command associated with the zone is relayed to the microprocessor. The function command continues to be relayed until the z-value, which is still being monitored, drops below the predetermined level. In this way, the absolute positioning zone responds much like a mechanical button. For example, using the embodiment of a touch pad depicted in FIG. 7, if the absolute positioning zone 29 is programmed to operate as a "select" function button when the zone 29 is touched with sufficient z-value, the select function will continue, or select and keep selecting, until the touch is released to a point below the predetermined z-value. Thus, to operate the touch pad 21, a user moves or "glides" a finger across the relative cursor positioning zone 27 to control the corresponding movement of a cursor shown on the monitor 25. When the cursor is near a desired icon 39 to select, the user removes the finger from the touch pad relative cursor positioning zone 27, at which point cursor movement stops, and touches the absolute positioning programmable zone 29 to make a selection. For the duration of time the finger is continuously touching the touch pad surface after touching the absolute positioning programmable zone 29, the cursor will preferably not move and a select function will be relayed to the microprocessor. When the finger is again placed in the relative cursor positioning zone 27, the cursor again responds to the relative finger movement.

As will be clear to one of ordinary skill in the art, the invention as disclosed is not limited to one particular touch pad type or embodiment. Examples of standard touch pads which can be adapted to work well with the present invention are the Model TSM 920 touch pad manufactured by CIRQUE of Salt Lake City, Utah, as well as touch pads manufactured by ALPS of San Jose, Calif., the SYNAPTICS of San Jose, Calif., LOGITECH of Fremont, Calif., or others such as those disclosed herein. For simplified operation, standard touch pads can be adapted to provide the touch sensitive enter/select zone function by one of skill in the art either by modifying the touch pad microprocessor program or writing software in the main processor. One of skill in the art can write software or configure hardware to detect the touch of a finger with absolute coordinate location indicating that the finger has touched down within an enter/select zone. The software may optionally and preferably also include routines to confirm the finger does not merely "tap" the enter/select zone as required by standard touch pads to ensure only intentional touches are executed. The software may also optionally and preferably include routines to confirm there is no significant finger motion after the touch to ensure only intentional touches are executed. Furthermore, cursor motion is preferably inhibited after the touch is detected within the zone to assist a user in making an accurate selection.

The enter/select zone is particularly advantageous because many users have difficulty creating the proper "down and up" timing of a tap motion on standard touch pads. Because of this difficulty and the reassuring mechanical "click" sound accompanying mechanical buttons, touch pads are often accompanied with mechanical buttons which can be depressed by an operator to generate a "mouse button click" command. The enter/select zone of the present invention is simple, and easy to use so mechanical buttons are not needed. This configuration is a tremendous advantage in terms of reliability, cost savings, and easier design for manufacturers of kiosks.

It is contemplated that the touch pad of the current invention may be used with a monitor either with or without touch screen capabilities. Preferably, however, the different embodiments of the touch pad described in relation to the foregoing figures will be used as an inexpensive substitute for a touch screen monitor in a graphical interface system. It is also contemplated that, due to the ability to completely seal the system described above from contamination and fluids, this invention will be useful in conjunction with many applications not specifically described herein.

Although the invention has been described with regard to certain preferred embodiments, the scope of the invention is not limited by these embodiments and is to be defined by the appended claims.

What is claimed is:

1. A touch pad comprising:
a touch-sensitive surface including a plurality of programmable input zones, each programmable input zone programmed to transfer relative cursor positioning input to a microprocessor operably associated with said touch pad, wherein at least one of said plurality of programmable input zones is further programmed to simulate a mechanical button when a conductive object comes into proximity therewith.

2. The touch pad of claim 1, wherein said plurality of programmable input zones is a plurality of programmable touch responsive zones.

3. The touch pad of claim 1, wherein said at least one of said plurality of programmable input zones comprises an enter/select zone.

4. The touch pad of claim 3, wherein said plurality of programmable input zones further comprises a scroll zone.

5. The touch pad of claim 3, wherein cursor motion is inhibited when said conductive object comes into proximity with said enter/select zone.

6. The touch pad of claim 1, wherein said touch-sensitive surface further comprises sensory feedback corresponding to at least one of said plurality of programmable input zones.

7. The touch pad of claim 6, wherein said sensory feedback comprises tactile feedback comprising texture.

8. The touch pad of claim 6, wherein said sensory feedback comprises tactile feedback comprising a raised ridge corresponding to a boundary of said at least one of said plurality of programmable input zones.

9. The touch pad of claim 6, wherein said sensory feedback comprises a speaker device programmed to emit a sound when said conductive object comes into proximity with said at least one of said plurality of programmable input zones.

10. The touch pad of claim 9, wherein said speaker device is integrated with said touch pad.

11. The touch pad of claim 6, wherein said sensory feedback comprises visual feedback comprising a light programmed to illuminate when said conductive object comes into proximity with said at least one of said plurality of programmable input zones.

12. The touch pad of claim 1, further comprising a glass cover plate disposed adjacent to said touch-sensitive surface.

13. The touch pad of claim 1, further comprising an enclosure comprising:
a base having a well sufficient to receive said touch pad, said touch pad disposed within the well;
a cover disposed above said touch pad and affixed to said base; and
at least one gasket sealingly associated with said cover, touch pad and base.

14. The touch pad of claim 13, wherein said enclosure completely seals said touch pad from an outside environment.

15. The touch pad of claim 1, wherein said plurality of programmable input zones comprises at least one zone programmed to respond as a numeric pad.

16. The touch pad of claim 1, wherein said plurality of programmable input zones comprises at least one zone programmed to respond as an alphanumeric pad.

17. The touch pad of claim 1, wherein said plurality of programmable input zones comprises at least one zone programmed to respond as a recognition zone.

18. The touch pad of claim 1, wherein said plurality of programmable input zones comprises at least one zone programmed to respond as a mode selection zone to toggle a portion of said plurality of programmable input zones between absolute position recognition and relative position recognition functions.

19. The touch pad of claim 1, wherein said conductive object is a finger.

20. The touch pad of claim 1, wherein said at least one of said plurality of programmable input zones is programmed to simulate a mechanical button when said conductive object comes into initial proximity with said touch-sensitive surface in proximity with said at least one of said plurality of programmable input zones, and further programmed to transfer relative cursor positioning input to said microprocessor when said conductive object comes into initial proximity with said touch-sensitive surface out of proximity with said at least one of said plurality of programmable input zones.

21. A touch pad interactive control system comprising:
a touch pad comprising a non-mechanical touch-sensitive surface having a plurality of programmable input zones programmed to transfer relative cursor positioning input to a microprocessor operably associated with said touch pad, wherein at least one of said plurality of programmable input zones is further programmed to simulate a mechanical button when a conductive object comes into proximity therewith; and
a display device associated with said microprocessor.

22. The touch pad interactive control system of claim 21, wherein said at least one of said plurality of programmable input zones is an enter/select zone.

23. The touch pad interactive control system of claim 21, further comprising an enclosure, said enclosure housing said touch pad and said display device.

24. The touch pad interactive control system of claim 23, wherein said enclosure completely seals said touch pad and display device from an outside environment.

25. The touch pad interactive control system of claim 21, further comprising a durable, transparent cover plate disposed adjacent to said touch-sensitive surface.

26. The touch pad interactive control system of claim 25, wherein the durable, transparent cover plate comprises glass.

27. The touch pad interactive control system of claim 21, wherein said touch pad operates a graphical user interface.

28. An improvement in a kiosk of the type having a housing containing a microprocessor associated with a display and a user input device such that a user can interact with the microprocessor to access and display information on the display, wherein the improvement comprises:
having, as the user input device for interacting with the microprocessor, a touch pad comprising a touch-sensitive surface having a plurality of programmable input zones each programmed to transfer relative cursor positioning input to said microprocessor, wherein at least one of said plurality of programmable input zones is further programmed to relay a function to said microprocessor when a conductive object comes into proximity therewith.

29. The improvement in a kiosk of claim 28, wherein said function is an enter/select command.

30. A method of operating a touch pad comprising:
providing a touch pad having a plurality of programmable input zones, wherein at least one of the plurality of programmable input zones is a relative positioning zone and at least another of the plurality of programmable input zones is an absolute positioning zone;

bringing a conductive object in proximity with said relative positioning zone;

controlling movement of a cursor to a desired position by moving the conductive object in proximity with said relative positioning zone across the relative positioning zone and across said absolute positioning zone;

bringing a conductive object in proximity with said absolute positioning zone, said absolute positioning zone relaying a function command to an associated microprocessor in response thereto.

* * * * *